Patented Sept. 17, 1946

2,407,874

UNITED STATES PATENT OFFICE 2,407,874

FLUORINE-CONTAINING CERAMICS AND METHOD OF MAKING SAME

Walter A. Fraser, Irondequoit, N. Y., assignor to Bausch & Lomb Optical Company, Rochester, N. Y., a corporation of New York No Drawing. Application August 31, 1943, Serial No. 500,632

2 Claims. (Cl. 106—52)

This invention relates to novel fluorine-containing ceramic compositions and the method of making the same.

The ceramic compositions of the present invention are particularly adapted for use as optical glasses where glasses having relatively high reciprocal dispersions and low indices, are desired. Glass of this type has been produced by the introduction of fluorine into the batch, the fluorine having been heretofore introduced as an alkali-fluoride, silico-fluoride, alumino-fluoride, and the like.

The fluorine was added in the forms mentioned, as these fluoride compositions have a relatively high melting temperature and it was believed that the fluorine was less apt to be lost if the fluorine compound did not melt until the glass forming reactions were substantially complete. Fluorine was continued to be introduced in the forms mentioned even after it was discovered that the loss of fluorine during the melting of such glass batches was excessive.

I have discovered that the fluorine content of many ceramic compositions can be maintained relatively high, that is, the loss is less, if the fluorine is introduced in the form of an alkali metal acid fluoride. It might appear that such fluorine compounds would not be practical as a means of introducing fluorine, for they have low decomposition temperatures as compared with those of the previously used fluorides.

Although alkali metal acid fluorides do decompose at very low temperatures, I have found that they can be used as a source of fluorine particularly in many glasses without the excessive fluorine loss as compared with previously proposed glasses in which the fluorine was introduced in the forms heretofore discussed. As the fluorine loss is less, fluorine containing glasses produced in accordance with the present invention have a lower refractive index and a higher reciprocal dispersion than many of the previously proposed fluorine containing glasses.

The explanation of this apparent anomaly is believed to be that the alkali metal acid fluorides start to decompose at a relatively low temperature and enter into the glass forming reactions at an early stage of the melting and that the fluorine is captured and retained in the glassy matrix. Where the fluorine is introduced in the forms of fluorides having higher melting temperatures than the alkali metal acid fluorides, it appears that, as these previously used compounds are very refractory, they do not decompose until the glass forming reactions are substantially complete.

It has been noted by prior workers in the art that in fluorine containing glasses, an excessive loss of fluorine in melting is caused by the presence of water in the batch, that is, by the use of compounds yielding water on decomposition such as boric acid and aluminum hydrate, or containing water of crystallization, such as potassium carbonate and similar compounds. It was believed that when such materials are used, considerable fluorine is volatilized as hydrofluoric acid during the melting process.

Furthermore, boric acid in decomposing reacts with the refractory fluorides heretofore used to form boron fluoride which is extremely volatile and lost during the melting operation.

In the optical glass compositions of the present invention, although considerable boric acid is used to insure the desired transparency in the resulting glasses, a larger percentage of the fluorine introduced into the batch in the form of an alkali metal acid fluoride is retained than where the previously proposed fluorides were used. The probable explanation of this phenomena is that the boric acid reacts at intermediate temperatures with the fluorides heretofore used, while the alkali metal acid fluorides begin decomposing at much lower temperatures and enter into the glassy matrix before the boric acid will react with the same.

In addition to the fact that it is difficult to retain the fluorine when introduced as anhydrous sodium fluoride or potassium fluoride, these two compounds are hygroscopic and tend to react with the water absorbed and the carbon dioxide usually present in the air. These fluorine compounds are further objectionable as they both tend to increase the amount of hydrogen fluoride liberated, thereby increasing the fluorine loss.

Another disadvantage which occurs when anhydrous sodium fluoride or potassium fluoride is used, is that it may not be desirable to add as much alkali to the batch as would be required when these alkali fluorides are used to insure that the desired amount of fluorine would be present in the batch. Thus, it is possible to reduce the alkali and yet maintain the percentage of fluorine desired when the latter is introduced into the batch as an alkali metal acid fluoride. This permits more of the alkali to be introduced as a nitrate or a carbonate which, as is well known, aids in the fining operation.

Although any of the alkali metal acid fluorides can be used as a source of fluorine, I prefer to use either potassium acid fluoride or sodium acid fluoride as these two compounds are easily procured on the open market free from impurities and at a cost substantially less than that of the other alkali-acid fluorides.

The amount of fluorine to be present in the glass will, of course, depend upon the use to which the glass is put. The compositions of fluorine containing glasses vary considerably and the following tables will illustrate typical batches which can be produced by the method of the present invention:

OPTICAL FLUOR-CROWN GLASSES

TABLE I
*Batch compositions*

|  | I | II | III | IV |
|---|---|---|---|---|
| $SiO_2$ | 300 | 300 | 300 | 300 |
| $K_2CO_3$ | 25.8 | 19.5 | 59.8 |  |
| $KNO_3$ | 18.9 | 14.2 | 43.8 |  |
| $KHF_2$ | 168.4 | 105.2 | 52.8 |  |
| $Na_2CO_3$ |  |  |  | 56.8 |
| $NaNO_3$ |  |  |  | 45.6 |
| $NaHF_2$ |  |  |  | 179.6 |
| $H_3BO_3$ | 212.2 | 45.4 | 171.8 | 158.4 |
| $Al(OH)_3$ |  | 78.4 | 82.8 | 158.1 |
| $As_2O_3$ | 0.63 | 0.51 | 0.57 | 0.69 |

TABLE II
*Percentage compositions*

|  | I | II | III | IV |
|---|---|---|---|---|
| $SiO_2$ | 47.6 | 58.6 | 52.60 | 43.6 |
| $K_2O$ | 20.3 | 16.3 | 16.30 |  |
| $Na_2O$ |  |  |  | 20.3 |
| F | 13.0 | 10.0 | 4.50 | 8.0 |
| $B_2O_3$ | 19.0 | 5.0 | 17.00 | 13.0 |
| $Al_2O_3$ |  | 10.0 | 9.50 | 15.0 |
| $As_2O_3$ | 0.1 | 0.1 | 0.10 | 0.1 |

TABLE III
*Optical properties*

|  | I | II | III | IV |
|---|---|---|---|---|
| $N_D$ | 1.4900 | 1.4622 | 1.4774 | 1.5016 |
| $V = \frac{N_D - 1}{N_F - N_G}$ | 70.1 | 68.0 | 65.9 | 62.2 |

Although the compositions set out in the above tables have been limited to batch compositions producing optical glasses, the invention is not limited to such glasses, for in the broadest aspect thereof, the same may be used to produce opal glasses, enamels, glazes, and other ceramic compositions in which it is desired to have fluorine present in the finished body. I have produced excellent opal glasses by introducing fluorine as an alkali metal acid fluoride, and the following are examples of two of the batch compositions used.

FLUORINE OPAL GLASSES

TABLE I
*Batch compositions*

|  | I | II |
|---|---|---|
| $SiO_2$ | 300 | 300 |
| $Na_2CO_3$ | 77.7 | 21.0 |
| $NaNO_3$ | 62.3 | 16.8 |
| $NaHF_2$ | 64.6 | 150.6 |
| $H_3BO_3$ | 43.9 | 40.8 |
| $Al(OH)_3$ | 75.8 |  |
| $As_2O_3$ | 0.5 | 0.5 |

TABLE II
*Percentage compositions*

|  | I | II |
|---|---|---|
| $SiO_2$ | 58.26 | 58.88 |
| $Na_2O$ | 19.52 | 18.39 |
| F | 7.7 | 18.11 |
| $B_2O_3$ | 4.80 | 4.52 |
| $Al_2O_3$ | 9.62 |  |
| $As_2O_3$ | 0.1 | 0.10 |

It will be at once apparent that various modifications of the nature of the several constituents in a particular batch and the percentage composition thereof are possible without departing from the spirit of the invention or the scope of the appended claims.

I claim:

1. A glass batch containing the following materials in approximately the following parts by weight:

| | |
|---|---|
| $SiO_2$ | 300 |
| $K_2CO_3$ | 25.8 |
| $KNO_3$ | 18.9 |
| $KHF_2$ | 168.4 |
| $H_3BO_3$ | 212.2 |
| $As_2O_3$ | 0.63 |

2. A glass batch for a fluor-crown optical glass having a refractive index of about 1.490–1.501 and a reciprocal relative dispersion of about 62.2–70.1 comprising about the following parts by weight: $SiO_2$ 300, $H_3BO_3$ 45–212, and $KHF_2$ 52–168.

WALTER A. FRASER.